(12) United States Patent
Romani

(10) Patent No.: US 6,735,956 B2
(45) Date of Patent: May 18, 2004

(54) HIGH PRESSURE TURBINE BLADE COOLING SCOOP

(75) Inventor: Giuseppe Romani, Mississauga (CA)

(73) Assignee: Pratt & Whitney Canada Corp., Longueil (CA)

( * ) Notice: Subject to any disclaimer, the term of this patent is extended or adjusted under 35 U.S.C. 154(b) by 130 days.

(21) Appl. No.: 10/039,945

(22) Filed: Oct. 26, 2001

(65) Prior Publication Data
US 2003/0079478 A1 May 1, 2003

(51) Int. Cl.[7] .............................. F02C 3/04; F01D 5/18
(52) U.S. Cl. ............................ 60/806; 415/115; 416/95
(58) Field of Search .................. 60/782, 806; 415/115; 416/95

(56) References Cited

U.S. PATENT DOCUMENTS

| | | | |
|---|---|---|---|
| 2,506,581 A | * 5/1950 | Cowles, Jr. | 415/115 |
| 2,648,520 A | 8/1953 | Schmitt | |
| 2,853,272 A | 9/1958 | Odds | |
| 2,915,279 A | 12/1959 | Chamberlin | |
| 2,928,650 A | * 3/1960 | Hooker et al. | 416/95 |
| 2,951,340 A | * 9/1960 | Howald | 60/806 |
| 3,814,539 A | * 6/1974 | Klompas | 416/95 |
| 3,980,411 A | 9/1976 | Crow | |
| 3,989,410 A | * 11/1976 | Ferrari | 415/115 |
| 4,178,129 A | 12/1979 | Jenkinson | |
| 4,236,869 A | * 12/1980 | Laurello | 416/95 |
| 4,247,257 A | * 1/1981 | Benoist et al. | 416/95 |
| 4,348,157 A | * 9/1982 | Campbell et al. | 416/95 |
| 4,522,562 A | 6/1985 | Glowacki et al. | |
| 4,759,688 A | 7/1988 | Wright et al. | |
| 4,761,116 A | * 8/1988 | Braddy et al. | 416/92 |
| 4,807,433 A | 2/1989 | Maclin et al. | |
| 4,882,902 A | 11/1989 | Reigel et al. | |
| 5,143,512 A | 9/1992 | Corsmeier et al. | |
| 5,311,734 A | * 5/1994 | Pope et al. | 60/782 |
| 6,065,932 A | 5/2000 | Dodd | |
| 6,077,035 A | * 6/2000 | Walters et al. | 415/115 |
| 6,468,032 B2 | * 10/2002 | Patel | 415/115 |
| 6,532,744 B1 | * 3/2003 | Reiter et al. | 60/782 |

FOREIGN PATENT DOCUMENTS

| | | | |
|---|---|---|---|
| DE | 1221497 | | 7/1966 |
| DE | 1942346 | | 3/1971 |
| FR | 2324873 | * | 9/1975 |
| FR | 2576358 | | 1/1985 |

* cited by examiner

Primary Examiner—Ted Kim
(74) Attorney, Agent, or Firm—Ogilvy Renault

(57) ABSTRACT

A turbine blade and assembly for use in a gas turbine engine are provided. The turbine blade has a root portion adapted for mounting to a rotor, and an airfoil portion extending from the root portion. A cooling air inlet duct is provided and adapted to communicate with the cooling air plenum when installed to the rotor. The air inlet duct has an inlet scoop portion adapted to extend into the cooling air plenum and an inlet scoop aperture oriented and adapted to capture cooling air from the cooling air plenum as a consequence of turbine rotation when the blade is mounted to the rotor. Scooped air is provided to a cooling air channel defined in an airfoil portion of the blade for the purpose of cooling the blade. The engine optionally includes a bearing gallery cooling air jacket in communication with the low pressure compressor stage for the purpose of cooling.

7 Claims, 3 Drawing Sheets

HIGH PRESSURE TURBINE BLADE COOLING SCOOP

TECHNICAL FIELD

The invention relates to a gas turbine engine having a single stage high work high pressure turbine with blade cooling scoops to intake cooling air from an adjacent plenum for blade cooling.

BACKGROUND OF THE ART

The invention relates to cooling systems for the turbine blades of a gas turbine engine and in particular an improved cooling air supply system for an engine that has a single stage high work high pressure turbine. For such a turbine there is a high pressure drop between the vane inlet to the blade outlet. For this reason, the blade inlet and outlet gas path pressure is lower than for other types of turbines and as a result cooling air can be taken from a low pressure stage of the engine rather than the conventional high pressure stage. Conventional engines include rather complex inlet structures including tangential onboard injection, turbine cover plates with impeller surfaces and associated seals, all of which add to the mechanical complexity of the system.

Under elevated operating conditions, gas turbine engine components, such as turbine rotors and blades are conventionally cooled by a flow of compressed air discharged at a relatively cool temperature. The flow of cooling air across the turbine rotor and through the interior of the blades removes heat through heat exchange so as to prevent excessive reduction of the mechanical strength properties of the turbine blades and turbine rotor. The operating temperature, efficiency and output of the turbine engine are limited by the high temperature capabilities of various turbine elements and the materials of which they are made. The lower the temperature of the elements, the higher strength and resistance to operating stress. However, the performance of the gas turbine engine is also sensitive to the amount of air flow that is used for cooling the hot turbine components. If less air is used for cooling functions, the efficiency and performance of the engine improves. As well, aircraft engine efficiency is very sensitive to weight penalties imposed by use of complex cooling system components.

To cool turbine rotor blades conventionally a flow of high pressure cooling air is introduced at a low radius close to the engine's centre line axis. An example of a conventional cooling air system for a turbine is shown in U.S. Pat. No. 5,984,636 to Fahndrich et al. The cooling air flow is introduced with a swirl or tangential velocity component through the use of tangential on board injectors with nozzles directed at the rotating hub of the turbine rotor. The cooling air is then passed between a turbine cover plate and the surface of the turbine rotor to simultaneously cool the rotor hub and to increase the pressure through centrifugal pumping of the air as it is conducted to the blades on the periphery of the turbine hub. The requirement for tangential on board injectors, cover plates and associated running seals significantly increases the mechanical complexity of the turbine blade cooling system. However, since conventional engines have hot gas path pressures that are relatively high, the pressure of the cooling air must exceed the hot gas path pressure. Due to the high pressure of the hot gas path, conventionally it is necessary to intake high pressure cooling air and increase the pressure of the air through onboard injection and impeller action of the cover plate in order to ensure that sufficient air flow is conducted through the turbine blades for cooling purposes and exits the trailing edge of the turbine blade into the hot gas path.

It is an object of the present invention to reduce the efficiency penalty of conventional cooling air system for turbine blades by utilising low-pressure air from the low-pressure compressor stage.

It is a further object of the invention to eliminate the mechanical complexity of conventional cooling systems by eliminating tangential onboard injection, cover plates and seals It is a further object of the invention to utilize a high work single stage high-pressure turbine with gas path pressure lower than turbines conventionally used to enable use of low-pressure sources for cooling air for the turbine blades.

Further objects of the invention will be apparent from review of the disclosure, drawings and description of the invention below.

DISCLOSURE OF THE INVENTION

The invention provides a gas turbine engine having a single stage high work high-pressure turbine with unique blade cooling scoops. The turbine blades include a cooling air inlet duct communicating with a cooling air plenum with pressure above the hot gas path pressure. A blade airfoil extends radially from the root and includes cooling air channels communicating between the cooling air inlet duct and the hot gas path of the engine. The air inlet duct includes an inlet scoop extending into the cooling air plenum with an inlet scoop aperture oriented to capture cooling air from the plenum as a consequence of the turbine rotation. The engine includes a low-pressure compressor stage in flow communication with the cooling air plenum. Advantageously, the engine includes a bearing gallery adjacent the cooling air plenum, where the bearing gallery includes a cooling air jacket in communication with the low pressure compressor stage, and the cooling air jacket communicates with the low pressure cooling air plenum. A labyrinth seal is provided between the hot gas path and the cooling air plenum.

The use of inlet air scoops in conjunction with the high work single stage high pressure turbine is feasible for the following reasons. The high work single stage high pressure turbine has a gas path pressure that is lower than conventional turbines and for this reason low pressure cooling air sources can be adopted. Of course, the cooling air pressure must be at least marginally higher than the gas path pressure in order to ensure that cooling air of sufficient quantity is conducted through the high pressure turbine blades to affect cooling. The invention, greatly simplifies turbine blade cooling systems by providing a low pressure cooling air plenum within which the high pressure turbine rotor rotates. Extending into the cooling air plenum are the blade roots of the turbine blades together with air inlet ducts with inlet scoops oriented to capture cooling air from the plenum as a consequence of the turbine rotation.

Therefore, the invention eliminates tangential onboard injectors, cover plates and associated seals that are conventionally necessary to increase the pressure of cooling air. Since the hot gas path pressure is lower for high work turbines, low pressure air can be drawn through the rotation of the inlet scoops by the rotating turbine within a cooling air plenum supplied by low pressure cooling air from the low pressure stage of the compressor.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF THE PREFERRED EMBODIMENT

Figure 1:
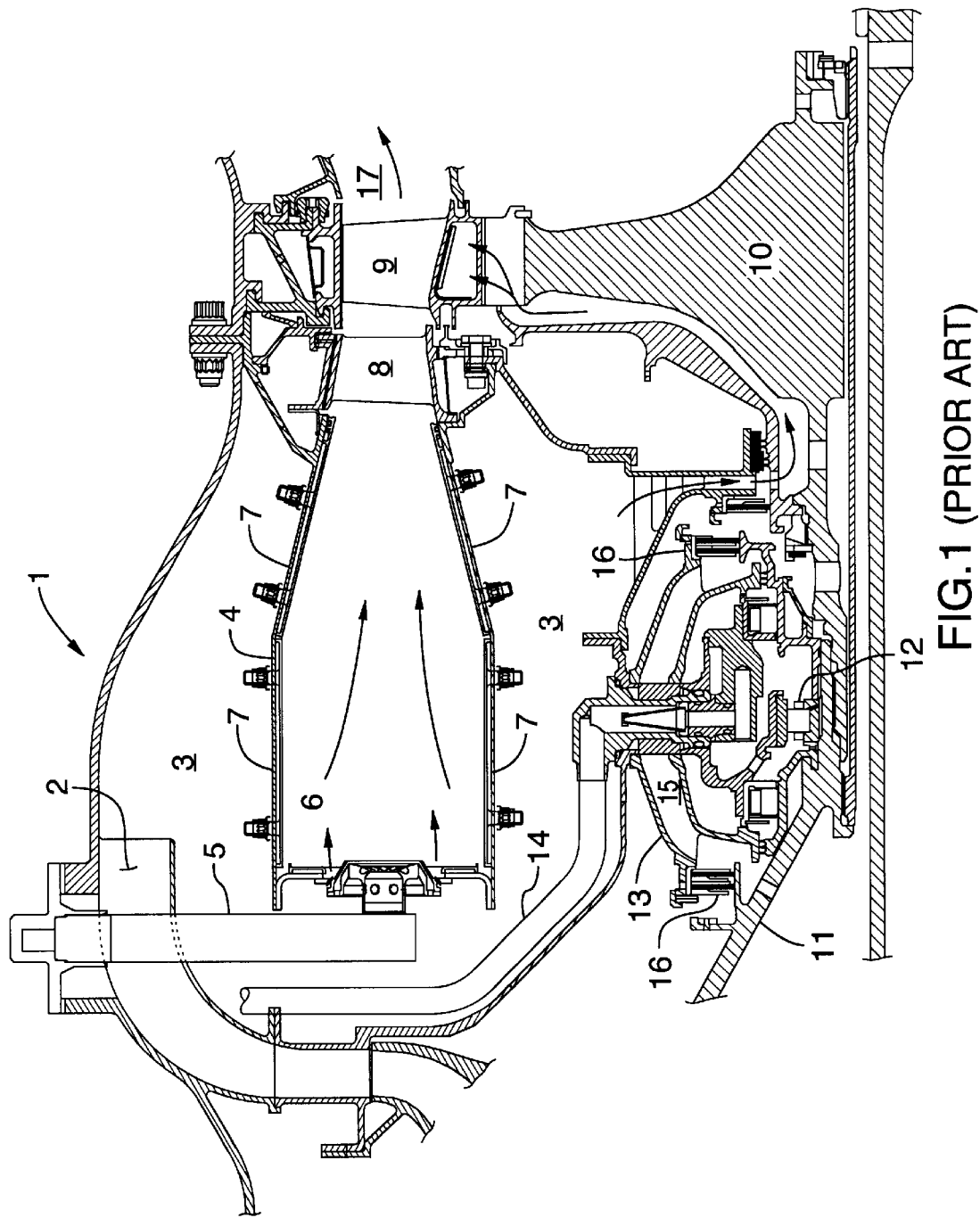
FIG. 1 shows a prior art axial cross-section through the centre line of a conventional gas turbine engine with a combustor exhausting hot gas towards a single stage turbine.

FIG. 1 illustrates an axial halt cross-section through the relevant components of a "prior art" conventional gas turbine engine 1. A centrifugal compressor impeller (not shown) intakes low pressure air from the first low pressure stage compressor (not shown) and delivers high pressure compressed air via a diffuser 2 to a high pressure plenum 3 surrounding the combustor 4.

Fuel is delivered to the combustor 4 via a fuel tube 5 to a fuel spray nozzle 6. Through a series of inlets 7 compressed air from the high pressure plenum 3 enters into the interior of the combustor 4, is mixed and ignited with the fuel from the nozzle 6.

The hot gases created within the combustor 4 are directed along a gas path 17, past an array of stator blades a and past the turbine blades 9 mounted to the rotor hub 10 thereby rotating turbine and, thus, also the centrifugal impeller (not shown) to which it is connected. A roller bearing 12 is housed within a bearing gallery 13 and supports the shaft 11 on which the rotor 10 and impeller 1 are mounted. Cooling air is taken from the compressor and injected (see arrows in FIG. 1) through known means (such as the tangential onboard injectors described in the Background) for supply to the turbine blade 9 and other components for cooling.

The innermost chamber of the gallery 13 is supplied with lubricating oil via an oil supply conduit 14 and oil is removed via a scavenge conduit (not shown). An outer most chamber 15 of the gallery 13 is ventilated with low pressure compressed cooling air and sealed with seals 16. Compressed cooling air delivered to the air chamber 15 of the bearing gallery 13 is provided through a low pressure air supply conduit (not shown) communicating between the low pressure stage compressor (not shown) and the bearing gallery air chamber 15, optionally through an external heat exchanger (not shown).

Figure 2:
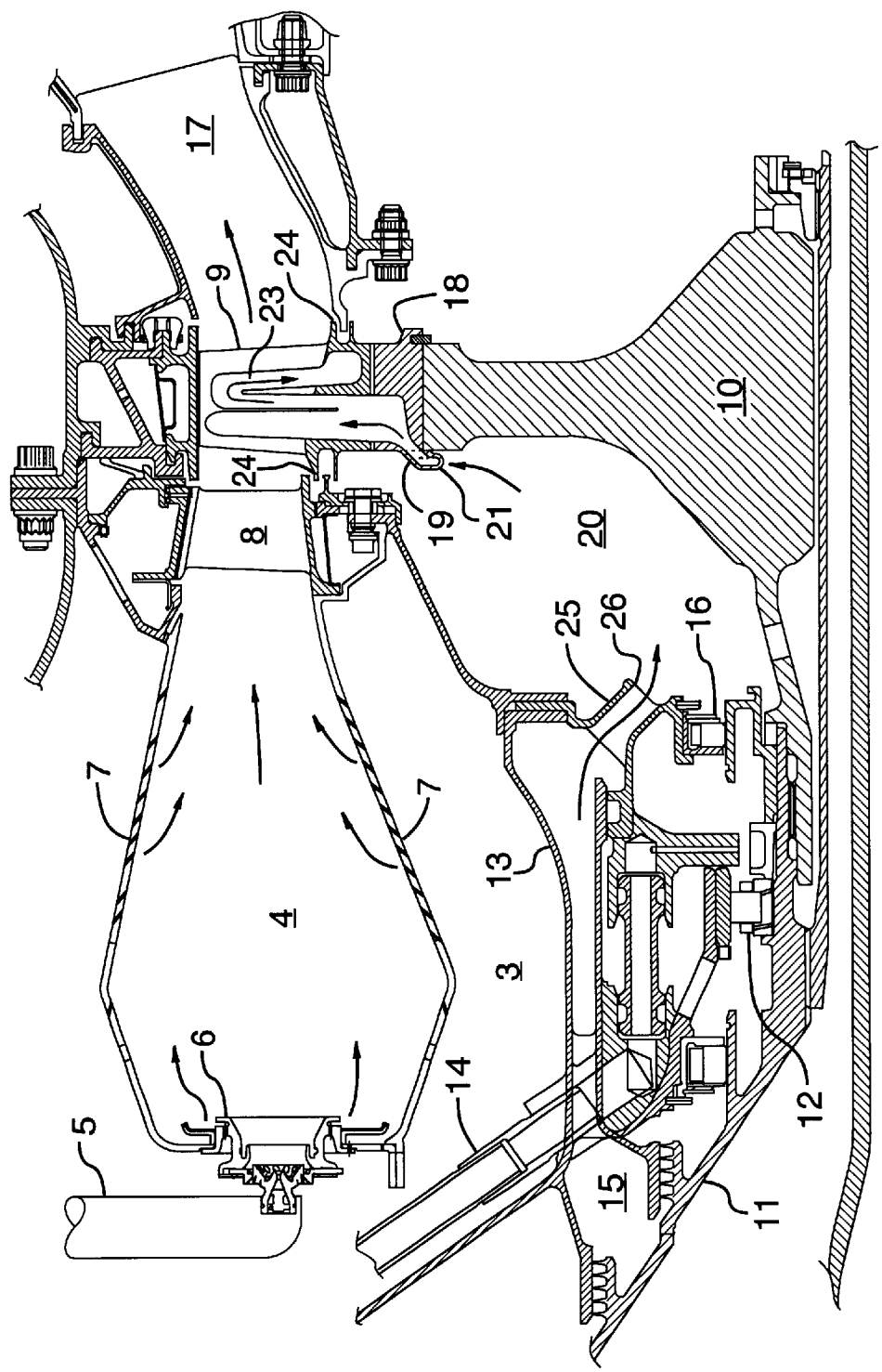
FIG. 2 shows the present invention applied to a high work single stage high pressure turbine with turbine blade roots including an inlet duct with inlet scoop to intake air as a result of the turbine rotation from a low pressure cooling air plenum within which the turbine is rotated.
Figure 3:
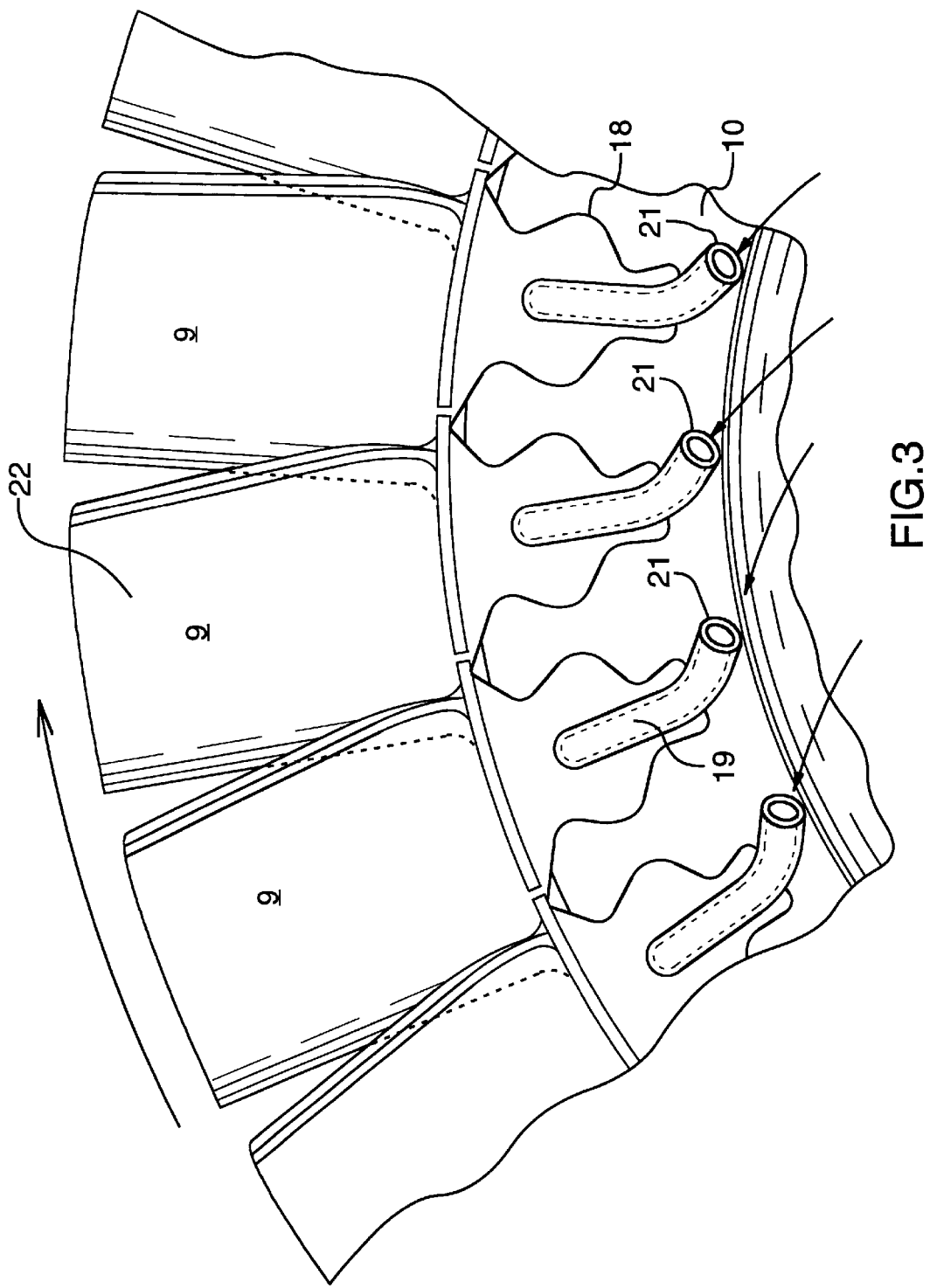
FIG. 3 is a radial partial elevation view of a segment of turbine showing blades, blade roots and inlet scoops indicating the direction of inlet air and rotation of the turbine with arrows.

Referring to FIGS. 2 and 3, a preferred embodiment of the present invention is shown. The reference numerals used in describing the prior art engine, above, are also used to denote the similar components of the embodiment of the engine according present invention described below.

Referring to FIG. 2, a plurality of turbine blades 9 is mounted to a single stage high work high pressure turbine 10 of the gas turbine engine. The hot gas path 17 has a pressure (during operation of the engine) downstream of the turbine which is lower than conventional gas turbine engines because of the effect of the high work high pressure turbine on the gas flow therethrough, as described further below.

The turbine direction of rotation about the engine axis is shown in FIG. 3 in the form of an arrow about the periphery of a blade. Each turbine blade 9 is individually inserted and joined to the turbine hub 10 at a blade root 18 using "fir tree" matching surfaces on the blade root and slots in the turbine periphery, as shown in FIG. 3. Other conventional means of connecting turbine blade roots 18 to the hub may also be used. The blade roots 18 also each include a cooling air inlet duct 19 communicating at one end with the cooling air plenum 20 within which the turbine 10 is rotating, and at another end with the blade interior, as described below. Relatively cool air is bled from the compressor (not shown) and fed to cooling air plenum through conventional means (not shown). Compressed cooling air may also be delivered to the air chamber 15 of the bearing gallery 13 through a low pressure air supply conduit (not shown) to cool the gallery, as described in more detail below.

The blades 9 include blade air foils 22 that extend radially from the root 18 and include cooling air channels 23 communicating between the cooling air inlet duct 19 and the hot gas path of the engine 17 as shown in FIG. 2 and exiting through openings in the trailing edge of the blade (not shown). The cooling air inlet duct 19 has an inlet scoop 21 with aperture at a "lower radius" or radially inward of the bottom surface of the root 18. As seen in FIG. 3, the inlet scoop aperture is open tangentially in the direction of turbine rotation to capture cooling air inward of the bottom surface of the root 18 (as indicated with arrows) as a consequence of turbine rotation.

Each air inlet duct 19 includes an inlet scoop 21 extending into the cooling air plenum 20 to take in air through an inlet scoop aperture oriented and adapted (as best shown in FIG. 3) to capture the relatively stationary cooling air from the plenum 20 as a result or consequence of the turbine rotation (the direction of which is shown by the arrow in FIG. 3).

As indicated in FIG. 3, the inlet scoop aperture is oriented to have a tangential component (i.e. more or less in the direction of turbine rotation) and, optionally, as illustrated in FIG. 3, the air inlet scoop aperture orientation may also include a radial component, (i.e. more or less faces the turbine axis of rotation). Optimization of the scoop shape, aperture size, and orientation depends on the turbine radius, speed of rotation and the parameters of the cooling air plenum, as will be apparent by one skilled in the art in light of the present disclosure.

As mentioned, a high work single stage turbine experiences a relatively large pressure drop across the turbine because of the amount of work extracted from the flow. The resulting pressure of the gas path downstream of the turbine is therefore markedly lower than in other types of turbines. This pressure scenario in used to advantage in the present invention. The lower downstream gas path pressure permits a lower pressure blade cooling air source to be chosen. Turbine blade cooling air can be taken from a lower pressure intermediate stage (e.g. say, P2.5 or P2.8 air) of the compressor section rather than from the high pressure (e.g. P3) stage as is conventional in other engines One skilled in the art recognizes that P3 air is "expensive", thermodynamically speaking, and therefore it is advantageous to use a lower pressure air for cooling, where possible. Also, it will be apparent that the lower pressure air will be cooler that P3 air, since it has experienced less work by the compressor.

Due to the mentioned pressure characteristic of a high work single stage high pressure turbine, the simple provision of air inlet ducts 19 with inlet scoops 21, extending into the cooling air plenum 20 provides sufficient intake flow of cooling air to cool the turbine blades 19 without requiring the mechanical complexity of the prior art. The scooping action of the moving scoop removes air from the cooling plenum and moves it into the inlet duct 19. A pressure (and temperature) rise is also experienced, due to work done on the cooling air in scooping. The pressure rise can also assist in flowing the coolant downstream through air channel 23 and back to the hot gas path 17. Though the temperature rise caused by the scooping is not strictly desirable for a coolant flow, it can be offset by choosing the cooler P2x air to supply plenum 20.

To separate the cooling air plenum 20 from the hot gas path 17, sealing arrangements are required as shown, for example, in FIG. 2 at 24. Labyrinth seal 24 inhibits gas leakage from or to the cooling air plenum and the hot gas path immediately upstream of the turbine during normal engine operation. However, the cooling air plenum 20 should have an air pressure that is at least marginally higher than the pressure in the hot gas path 17 to ensure that hot air does not leak into cooling plenum 20 and degrade or destroy components therein. (One skilled in the art will understand that present labyrinth seals, such as seal 24, require at least a slight pressure gradient to prevent a back flow of hot gas into the plenum).

Optionally, as shown in FIG. 2 and mentioned above, compressed lower pressure cooling air may also be used to cool the air chamber 15 of bearing gallery 13. As mentioned above, compressed cooling air is bled from the compressor and delivered by conventional means (not shown) to the air chamber 15. As shown in FIG. 2, cooling air from the bearing gallery air chamber 15 is then exhausted into the cooling air plenum 20 through one or more nozzles 25. A separate flow metering aperture 26 with an accurately sized opening can be used to control the flow and pressure that are delivered to the cooling air plenum, as desired given the necessary design parameters.

Although the above description relates to a specific preferred embodiment as presently contemplated by the inventor, it will be understood that the invention in its broad aspect includes mechanical and functional equivalents of the elements described herein.

I claim:

1. A turbine blade for use in a gas turbine engine, the engine having a hot gas path, a cooling air plenum, and a single stage high work high pressure turbine, the turbine disposed in the hot gas path and having a rotor and a turbine direction of rotation about an axis, the turbine blade comprising:

a root portion having a bottom surface adapted for mounting to a rotor;

an airfoil portion extending from the root portion;

a cooling air inlet duct adapted to communicate with the cooling air plenum when installed to the rotor, the air inlet duct having an inlet scoop extending from the turbine blade axially and radially inwardly into the cooling air plenum, the inlet scoop having an inlet scoop aperture radially inward of the bottom surface of the root portion, the inlet scoop aperture open tangentially in the direction of turbine rotation and thereby adapted to capture cooling air from the cooling air plenum radially inward of the bottom surface of the root portion as a consequence of turbine rotation when the blade is mounted to the rotor; and a cooling air channel defined in an airfoil portion of the blade, the cooling air channel communicating with the cooling air inlet duct and the hot gas path of the engine, the cooling air channel being adapted to permit cooling air captured from the plenum by the cooling air inlet duct to pass through the channel to air outlet means for the purpose of cooling the blade.

2. A turbine blade according to claim 1 wherein the inlet scoop aperture orientation includes a component which is directed radially towards the turbine axis of rotation.

3. A turbine blade according to claim 1 wherein the blade root includes a labyrinth seal member.

4. A turbine blade cooling system for a gas turbine engine, the engine having single stage high work high pressure turbine, the cooling system comprising: a hot gas path defined in the engine; a cooling plenum in communication with a supply of pressurized air obtained from a compressor section of the engine; and a turbine assembly, the assembly comprising a rotor and a plurality of turbine blades mounted to the rotor, the blades having:

a root portion exposed to the cooling plenum and an airfoil portion exposed to the hot gas path, the root portion having a cooling air inlet duct, the air inlet duct having an inlet scoop portion extending into the cooling air plenum from the turbine blade axially and radially inwardly, the inlet scoop portion having an inlet scoop aperture radially inward of a bottom surface of the root portion, the inlet scoop aperture open tangentially in the direction of turbine rotation and adapted to divert cooling air from the cooling air plenum radially inward of the bottom surface of the root portion into the air inlet duct as a consequence of turbine rotation, the airfoil portion having a cooling air channel defined therein, the cooling channel extending between the cooling air inlet duct and air exit means in communication with the hot gas path of the engine, the cooling air channel adapted to permit air diverted from the cooling plenum into the cooling air inlet duct to pass through the channel to the air exit means for the purpose of cooling the turbine blade.

5. A turbine blade cooling system according to claim 4 further comprising a bearing gallery for housing a turbine shaft, the bearing gallery including a cooling air jacket in communication a supply of pressurized air obtained from a compressor section of the engine, the cooling air jacket also in communication with the cooling air plenum so that air supplied to the cooling jacket may flow to the cooling air plenum.

6. A turbine blade cooling system according to claim 4 wherein said pressurized air has a pressure less than a P3 air pressure of the engine.

7. A turbine blade cooling system according to claim 6 wherein said pressurized air is bled from an intermediate stage of the compressor section.

* * * * *